(12) United States Patent
Watanabe

(10) Patent No.: US 11,220,227 B2
(45) Date of Patent: Jan. 11, 2022

(54) WIRE HARNESS INCLUDING WIRE BUNDLE HAVING RELAY LINE WITH CONNECTOR, AND PROTECTOR COVERING WIRE BUNDLE AND HOLDING CONNECTOR

(71) Applicant: Yazaki Corporation, Tokyo (JP)

(72) Inventor: Jin Watanabe, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/148,149

(22) Filed: Jan. 13, 2021

(65) Prior Publication Data

US 2021/0221308 A1    Jul. 22, 2021

(30) Foreign Application Priority Data

Jan. 17, 2020   (JP) .............................. JP2020-006209

(51) Int. Cl.
*B60R 16/02*    (2006.01)
*H02G 3/04*    (2006.01)

(52) U.S. Cl.
CPC ....... *B60R 16/0215* (2013.01); *H02G 3/0437* (2013.01)

(58) Field of Classification Search
CPC ............ B60R 16/0215; B60R 16/0207; H02G 3/0437; H02G 3/0487
USPC ....................................................... 174/72 A
See application file for complete search history.

(56) References Cited

U.S. PATENT DOCUMENTS

| 7,179,997 | B2* | 2/2007 | Yamamoto | .......... B60R 16/0215 |
| | | | | 174/71 R |
| 9,457,741 | B2* | 10/2016 | Sasaki | ................. B60R 16/0207 |
| 2003/0070830 | A1* | 4/2003 | Kondo | ................... H01B 7/009 |
| | | | | 174/68.1 |
| 2015/0360627 | A1* | 12/2015 | Sasaki | .................... H01R 9/031 |
| | | | | 174/72 A |
| 2017/0057434 | A1 | 3/2017 | Nohara et al. | |

FOREIGN PATENT DOCUMENTS

| JP | 06021179 | * | 3/1994 |
| JP | 2002010438 | * | 1/2002 |
| JP | 2004-229350 A | | 8/2004 |
| JP | 2015-230873 A | | 12/2015 |

* cited by examiner

*Primary Examiner* — Timothy J Thompson
*Assistant Examiner* — Michael F McAllister
(74) *Attorney, Agent, or Firm* — Banner & Witcoff, Ltd.

(57) ABSTRACT

A wire harness includes: a wire bundle having a plurality of electric wires; and a protector attached to the wire bundle. The wire bundle has a relay line drawn out from the wire bundle. The relay line has a connector at an end portion of the relay line. The protector has: a housing portion to cover the wire bundle; and a connector holding portion capable of holding the connector in a first posture and a second posture different from the first posture. The connector holding portion is located in the housing portion within a range to allow the relay line to be extended to hold the connector on the connector holding portion. The connector is held by the connector holding portion in one of the first posture and the second posture to house the relay line in the protector.

3 Claims, 5 Drawing Sheets

WIRE HARNESS INCLUDING WIRE BUNDLE HAVING RELAY LINE WITH CONNECTOR, AND PROTECTOR COVERING WIRE BUNDLE AND HOLDING CONNECTOR

CROSS-REFERENCE TO RELATED APPLICATIONS

This application is based on and claims priority under 35 USC 119 from Japanese Patent Application No. 2020-006209 filed on Jan. 17, 2020, the contents of which are incorporated herein by reference.

TECHNICAL FIELD

The present disclosure relates to a wire harness including a wire bundle and a protector.

BACKGROUND ART

A wire harness mounted on a vehicle such as an automobile is generally configured as an assembly obtained by bundling, for example, a plurality of sub-harnesses respectively prepared for each system. Generally, the plurality of sub-harnesses are individually prepared so as to correspond to specifications required for the wire harness.

Examples of the specifications described above include a wide variety of electrical components mounted on the vehicle to correspond to various optional accessories (for example, a sound system and a power window system) selected in accordance with a type and a grade of the vehicle and a demand of a user (driver). Each of these electrical components has a different mode of electric wire such as a required power supply line, a ground line, a signal line, and a communication line. In order to operate optional equipment to be selectively mounted, a sub-harness that collects selectively provided electric wires (selected electric wires) is also referred to as an optional sub-harness. On the other hand, in order to operate a device such as an engine and a motor that are commonly mounted regardless of the type of vehicle or the like, a sub-harness that collects standardly provided electric wires (standard electric wires) is also called a standard sub-harness.

As for details of the above wire harness, refer to JP 2015-230873 A.

In recent years, application of information technology to vehicles such as automatic driving technology and external environment detection technology is rapidly advancing. As the number and types of electrical components mounted on a vehicle increase with an introduction of IT in such a vehicle, the number and types of sub-harnesses required to form a wire harness also tend to increase. For example, even when the same electrical component is mounted on the vehicle, a length of the sub-harness for operating the electrical component is different if a mounting position of the electrical component differs due to a difference in a specification of the vehicle or the like. At this time, unless the sub-harness of an appropriate length is used, the sub-harness cannot be connected to the electrical component in the first place when the length is excessively short, and an excess length portion of an electric wire can come into contact with a peripheral member or be in contact with the peripheral member when the length is excessively long, so that problems such as abnormal noise may occur. On the other hand, from a viewpoint of actually manufacturing the wire harness, it is desirable to reduce types of the sub-harnesses while satisfying a performance required for the wire harness and eliminating the problems, rather than individually preparing sub-harnesses of various lengths.

SUMMARY OF INVENTION

Aspect of non-limiting embodiments of the present disclosure relates to provide a wire harness capable of properly absorbing an excess length of a sub-harness during routing without excessively increasing a type of the sub-harness.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a wire harness comprising:
 a wire bundle having a plurality of electric wires; and
 a protector attached to the wire bundle,
 the wire bundle having a relay line drawn out from the wire bundle, the relay line having a connector at an end portion of the relay line,
 the protector having: a housing portion to cover the wire bundle; and a connector holding portion capable of holding the connector in a first posture and a second posture different from the first posture, the connector holding portion being located in the housing portion within a range to allow the relay line to be extended to hold the connector on the connector holding portion, and
 the connector being held by the connector holding portion in one of the first posture and the second posture to house the relay line in the protector.

BRIEF DESCRIPTION OF DRAWINGS

Exemplary embodiment(s) of the present invention will be described in detail based on the following figures, wherein.

DESCRIPTION OF EMBODIMENTS

Figure 1:
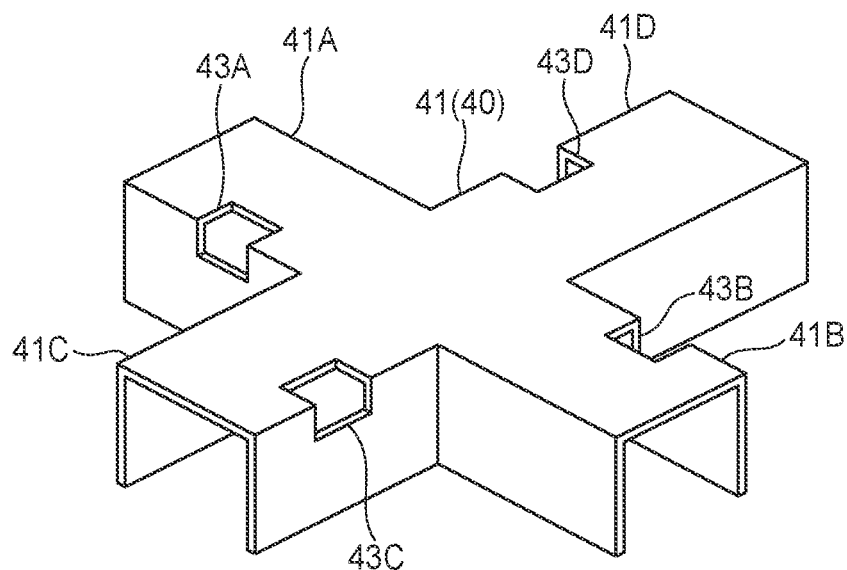
FIG. 1 is an exploded perspective view of a wire harness according to an exemplary embodiment of the present disclosure.
Figure 1:
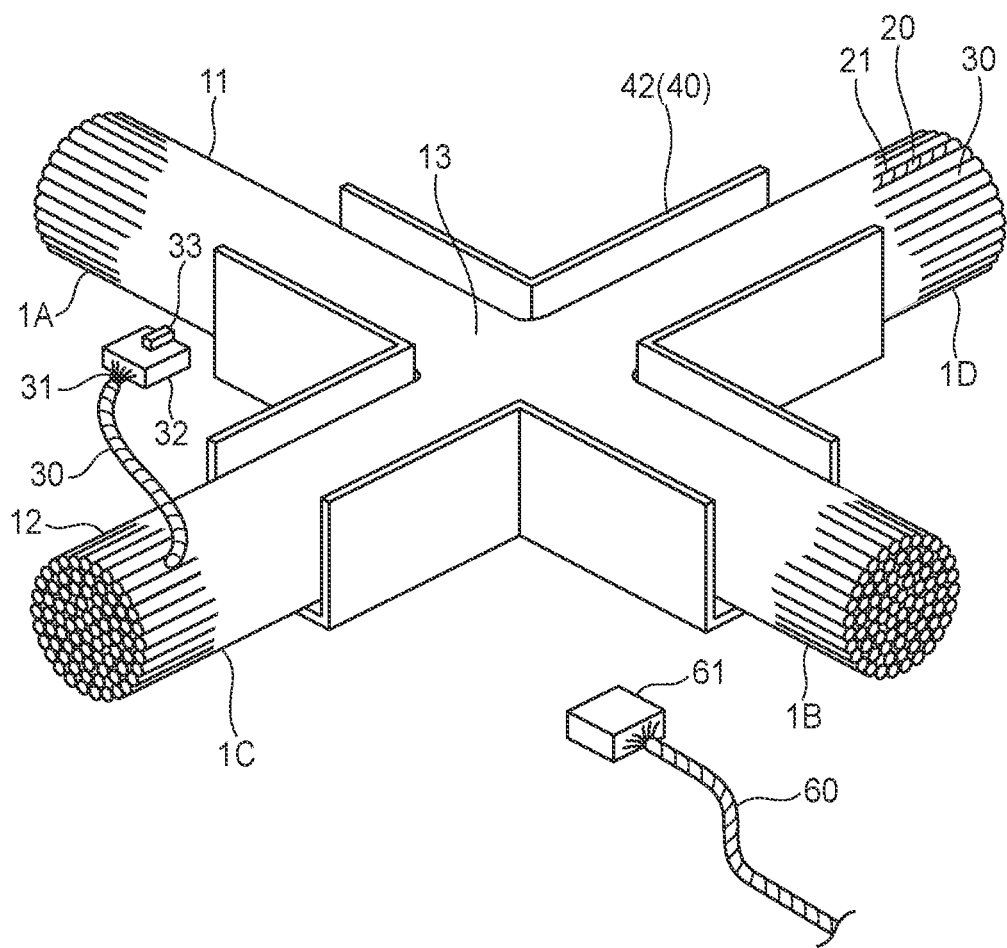
Figure 2:
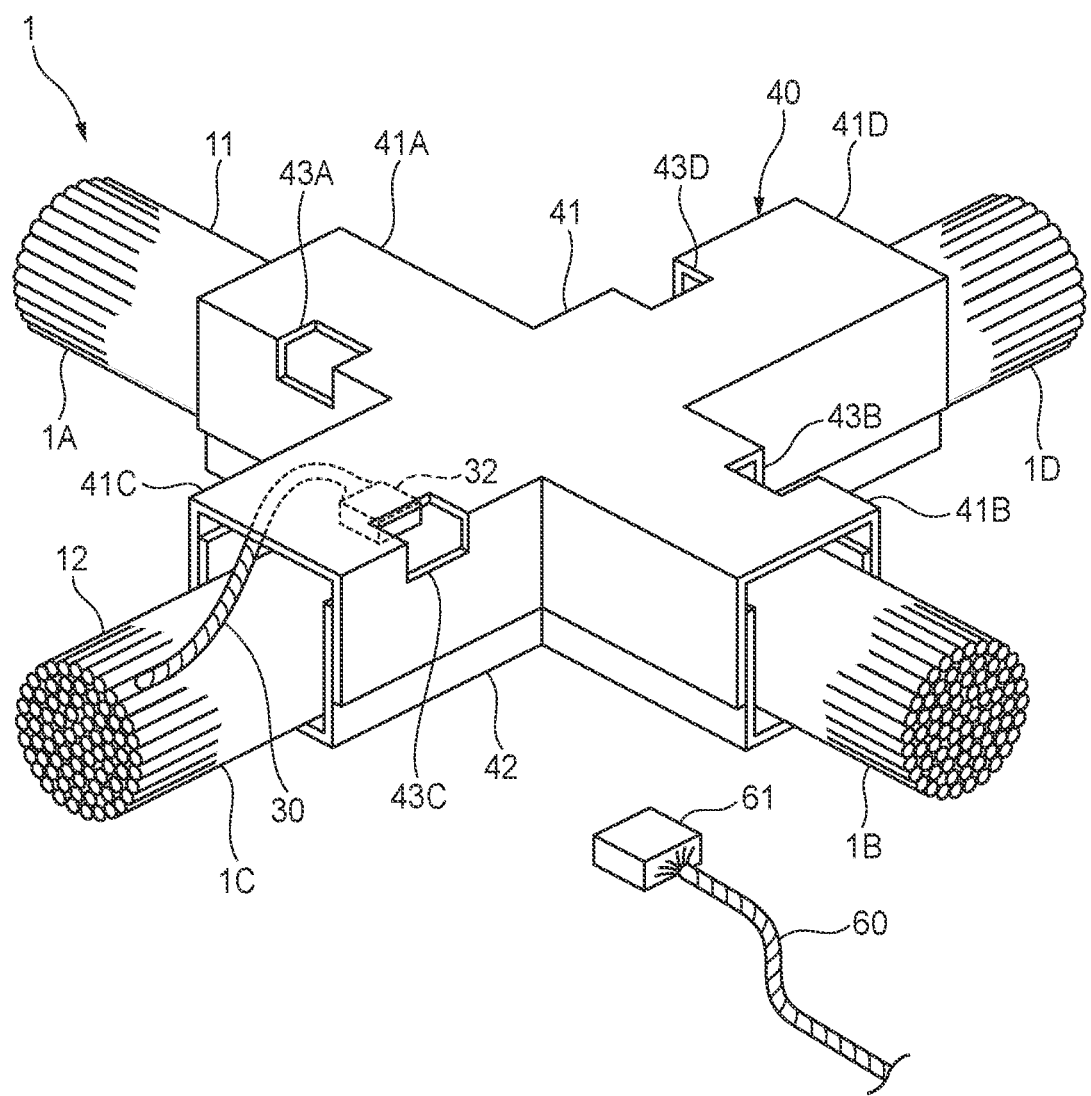
FIG. 2 is a perspective view showing the wire harness after assembly.

A wire harness 1 according to an exemplary embodiment of the present disclosure will be described with reference to FIGS. 1 to 4. First, an overall configuration of the wire harness 1 will be described.

The wire harness 1 according to the present exemplary embodiment is mounted on a vehicle such as an automobile. The wire harness 1 includes first and second trunk lines 11, 12 arranged on a vehicle body, and a protector 40 including a lid 41 and a body 42 and sandwiching the first and second trunk lines 11, 12 from an upper-lower direction of the vehicle for protection.

The first trunk line 11 of the wire harness 1 is routed to extend in, for example, a front-rear direction of the vehicle on the vehicle body. The second trunk line 12 of the wire harness 1 is routed to extend in, for example, a left-right (width) direction of the vehicle so as to intersect the first trunk line 11 at a substantially right angle. That is, the wire harness 1 according to the present exemplary embodiment is routed in a substantially cross shape as a whole, and includes a branch portion 13 at which the first and second trunk lines 11, 12 intersect and branch. The branch portion 13 of the wire harness 1 and a periphery thereof are covered and protected by the protector 40.

A portion of the first trunk line 11 located at a vehicle front side with respect to the branch portion 13 of the wire harness 1 is referred to as a front side portion 1A of the wire harness 1. Similarly, a portion of the first trunk line 11 located at a vehicle rear side is referred to as a rear side portion 1B of the wire harness 1; a portion of the second trunk line 12 located at a vehicle left side is referred to as a left side portion 1C of the wire harness 1, and a portion of the second trunk line 12 located at a vehicle right side is referred to as a right side portion 1D of the wire harness 1.

The wire harness 1 includes a standard sub-harness 20 configured by a plurality of standard circuit lines 21, and an optional sub-harness 30 configured by a plurality of selection circuit lines 31. The standard sub-harness 20 and the optional sub-harness 30 are integrally bundled in each of the first and second trunk lines 11, 12 of the wire harness 1, and the first and second trunk lines 11, 12 are configured as an assembly including the sub-harnesses 20, 30.

In one of branch lines extending from the branch portion 13 of the wire harness 1 (in the present example, the left side portion 1C of the wire harness 1), one of the optional sub-harnesses 30 is drawn out from the second trunk line 12 so as to extend from the branch bundle (left side portion 1C). Harness-side connectors 32 to be locked to a protector-side locking portion 44 or a protector-side locking portion 45 of the protector 40, which will be described later, are provided at an end portion of the optional sub-harness 30 drawn out from the branch bundle (left side portion 1C).

The harness-side connector 32 is a male connector, and is formed in a flat box shape by an insulating synthetic resin or the like. The selection circuit lines 31 of the optional sub-harness 30 are connected to a side face on one end of the harness-side connector 32. The harness-side connector 32 includes a locking portion 33 that can be locked to the protector-side locking portion 44 or the protector-side locking portion 45.

The lid 41 of the protector 40 is configured to cover one face of the body 42 that is opened to an upper side of the vehicle. The lid 41 and the body 42 of the protector 40 are formed of an insulating synthetic resin or the like. As described later, the body 42 accommodates the first and second trunk lines 11 and 12 at a bottom therein. The lid 41 covers the body 42, so that the protector 40 accommodates and protects the first and second trunk lines 11 and 12 therein. The lid 41 of the protector 40 is detachably provided to the body 42. Maintenance or replacement can be appropriately performed on the first and second trunk lines 11 and 12 by removing the lid 41.

Figure 3:
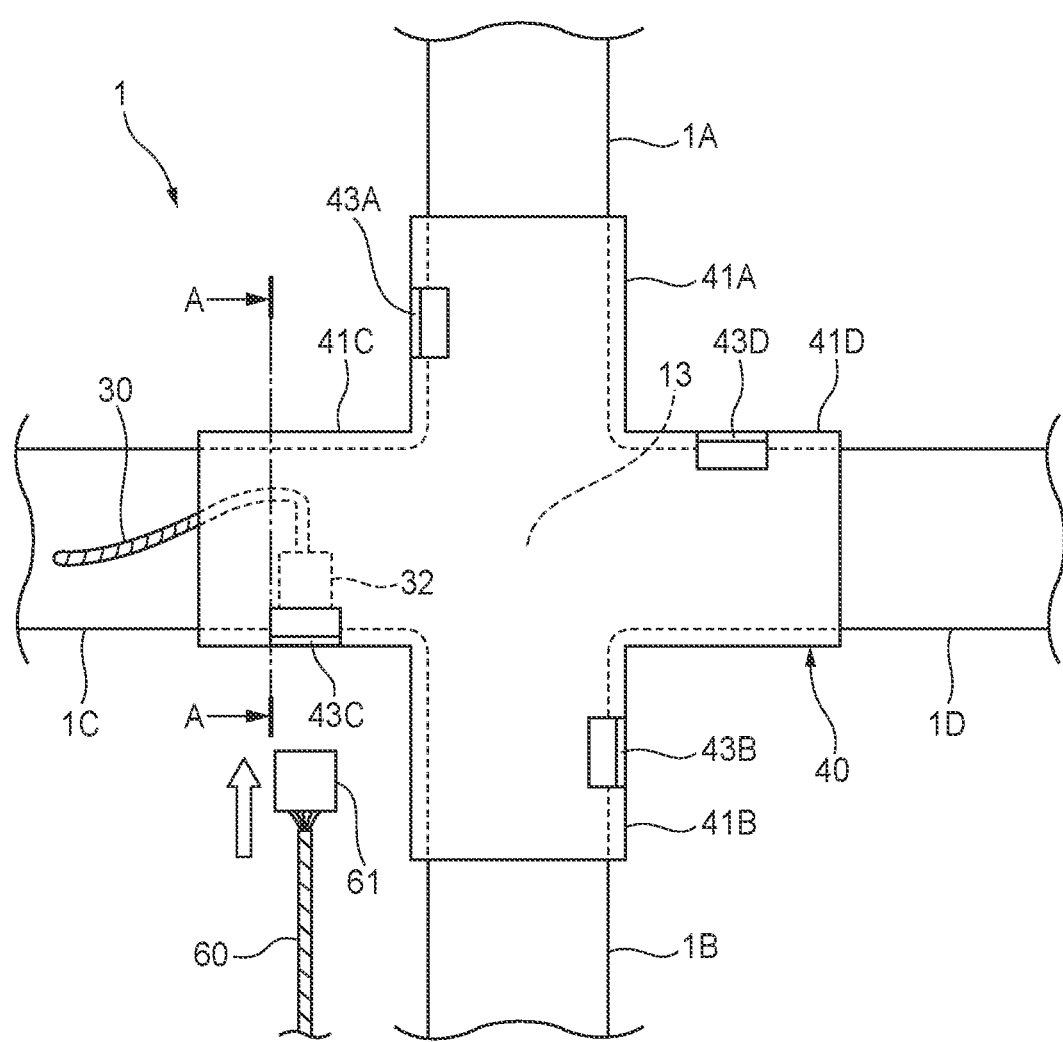
FIG. 3 is a top view of a protector shown in FIG. 2.

The lid 41 includes a housing portion 41A located on the vehicle front side, a housing portion 41B located on the vehicle rear side, a housing portion 41C located on the vehicle left side, and a housing portion 41D located on the vehicle right side so as to correspond to the front side portion 1A, the rear side portion 1B, the left side portion 1C, and the right side portion 1D of the wire harness 1 extending around the branch portion 13. Each of the housing portions 41A to 41D is provided with through holes 43A to 43D for communicating the lid 41 inside and outside. As shown in FIG. 3, the through holes 43A to 43D are disposed at point-symmetrical portions centered on the branch portion 13.

Figure 4:
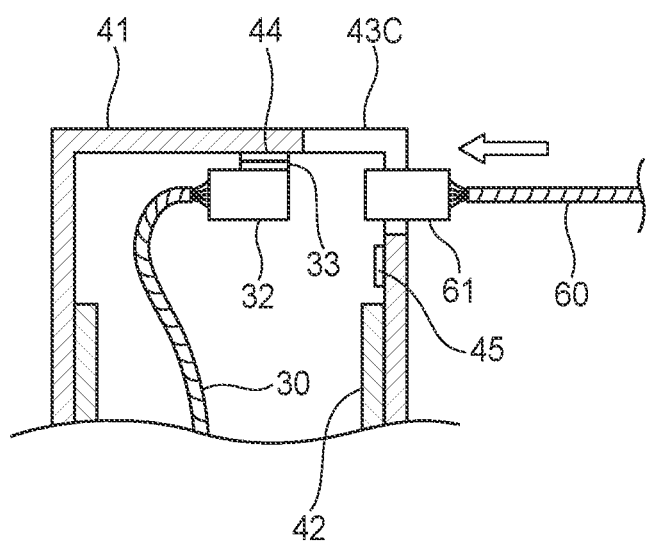
FIG. 4 is a cross-sectional view taken along a line A-A in FIG. 2.
Figure 5:
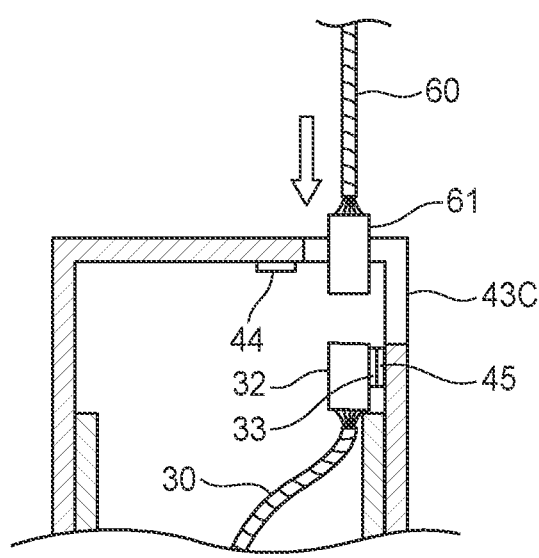
FIG. 5 is a view corresponding to FIG. 4 showing a wire harness according to another exemplary embodiment of the present disclosure.

As shown in a cross-sectional view in FIG. 4, an inner wall of the lid 41 around the through hole 43C is provided with the protector-side locking portions 44, 45 for locking the harness-side connector 32. The protector-side locking portion 44 has a structure capable of locking with the locking portion 33 of the harness-side connector 32, and holds the harness-side connector 32 in a posture facing an outside of the through hole 43C (lateral direction in the figure). On the other hand, as shown in FIG. 5, the protector-side locking portion 45 has a structure capable of locking with the locking portion 33 of the harness-side connector 32, and holds the harness-side connector 32 in a posture facing the outside of the through hole 43C (longitudinal direction in the figure). In this way, the protector-side locking portions 44, 45 can hold the harness-side connector 32 in two different postures.

The same protector-side locking portions 44, 45 are also provided in other through holes 43A, 43B, and 43D, so that the harness-side connector 32 can be held in a plurality of types of postures as necessary for any of the through holes 43A, 43B, and 43D.

As shown in FIGS. 4 and 5, an external connector 61 of an external sub-harness 60 extending from a predetermined electrical component (not shown) is fitted into the harness-side connector 32 held thus through the through hole 43C from an outside of the protector 40. Accordingly, the external sub-harness 60 is connected to the sub-harness 30 provided in the first and second trunk lines 11, 12.

Here, if the through holes 43A to 43D for exposing the harness-side connector 32 are selected conforming with an excess length of the external sub-harness 60, the excess length of the external sub-harness 60 can be absorbed without changing a length of the optional sub-harness 30 and a length of the external sub-harness 60 itself. In addition, if the posture of the harness-side connector 32 is selected conforming with the excess length of the external sub-harness 60, the excess length of the external sub-harness 60 can be absorbed more finely. Thus, the wire harness 1 can absorb the excess length of an electric wire (external sub-harness 60) at the time of routing while satisfying a performance required for the wire harness 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, in the above exemplary embodiment, as shown in FIG. 4, the harness-side connector 32 can be held by the protector 40 in two postures, that is, a posture in which the harness-side connector 32 is oriented in the lateral direction and a posture in which the harness-side connector 32 is oriented in the longitudinal direction. However, the protector 40 may be configured to hold the harness-side connector 32 in three or more different postures.

According to the above programmable embodiments, a wire harness (1) comprising:

a wire bundle (11, 12) having a plurality of electric wires; and a protector (40) attached to the wire bundle (11, 12), the wire bundle (11, 12) having a relay line (30) drawn out from the wire bundle (11, 12), the relay line (30) having a connector (32) at an end portion of the relay line (30), the protector (40) having: a housing portion (41A to 41D) to cover the wire bundle (11, 12); and a connector holding portion (43A to 43D, 44, 45) capable of holding the connector (32) in a first posture and a second posture different from the first posture, the connector holding portion (43A to 43D, 44, 45) being located in the housing portion (41A to 41D) within a range to allow the relay line (30) to be extended to hold the connector (32) on the connector holding portion (43A to 43D, 44, 45), and the connector (32) being held by the connector holding portion (43A to 43D, 44, 45) in one of the first posture and the second posture to house the relay line (30) in the protector (40).

According to the wire harness configured as described above, the connector of the relay line can be held in the first posture or the second posture in the connector holding portion provided in the housing portion of the protector without changing a length of the relay line drawn out from the wire bundle. Therefore, for example, if the posture of the connector of the relay line is selected conforming with the excess length of the sub-harness extending from an external device, the excess length of the external sub-harness can be properly absorbed without changing the length of the relay line or the external sub-harness. Therefore, the wire harness having the present configuration can properly absorb the excess length of the sub-harness at the time of routing without excessively increasing a type of the sub-harness.

The wire harness (1) may be configured such that a first fitting direction between the connector (32) and a counterpart connector (32) upon the connector (32) is held in the first posture and a second fitting direction between the connector (32) and the counterpart connector (32) upon the connector (32) is held in the second posture are different from each other.

According to the wire harness configured as described above, since the posture of the connector held by the connector holding portion is different, the fitting direction between the connector and the counterpart connector is different. For example, the fitting direction is an upper-lower direction when the connector is in the first posture, and the fitting direction is a horizontal direction when the connector is in the second position, so that the posture of the connector can be changed.

The wire harness (1) may be configured such that the wire bundle (11, 12) includes: a plurality of branch lines (1A to 1D) extending from a branch portion in a plurality of routing directions; and the relay line (30) drawn out from one of the plurality of the branch lines (1A to 1D), and the protector (40) includes: a plurality of housing portions (41A to 41D) to house each of the plurality of the branch lines (1A to 1D); and the connector holding portion (43A to 43D, 44, 45) located in at least one of the plurality of the housing portions (41A to 41D).

According to the wire harness configured as described above, the relay line is drawn out from at least one of the plurality of branch lines extending from the branch portion of the wire harness. Therefore, if a branch bundle from which the relay line is drawn out is selected conforming with a length of the excess length of the external sub-harness, and further the posture of the connector of the relay line is selected conforming with the excess length as described above, the excess length of the sub-harness can be more properly absorbed.

According to the present disclosure, it is possible to provide a wire harness capable of properly absorbing an excess length of a sub-harness during routing without excessively increasing a type of the sub-harness.

What is claimed is:

1. A wire harness comprising:

a wire bundle having a plurality of electric wires; and a protector attached to the wire bundle, the wire bundle having a relay line drawn out from the wire bundle, the relay line having a connector at an end portion of the relay line, the protector having: a housing portion to cover the wire bundle; and a connector holding portion capable of holding the connector in a first posture and a second posture different from the first posture, the connector holding portion being located in the housing portion within a range to allow the relay line to be extended to hold the connector on the connector holding portion, and the connector being held by the connector holding portion in one of the first posture and the second posture to house the relay line in the protector.

2. The wire harness according to claim 1, wherein a first fitting direction is defined between the connector and a counterpart connector upon the connector being held in the first posture and a second fitting direction is defined between the connector and the counterpart connector upon the connector being held in the second posture, the first fitting direction being different from the second fitting direction.

3. The wire harness according to claim 1, wherein the wire bundle includes: a plurality of branch lines extending from a branch portion in a plurality of routing directions; and the relay line drawn out from one of the plurality of the branch lines, and the protector includes: a plurality of housing portions to house each of the plurality of the branch lines; and the connector holding portion located in at least one of the plurality of the housing portions.

* * * * *